United States Patent
Zuberi

(10) Patent No.: US 7,698,439 B2
(45) Date of Patent: Apr. 13, 2010

(54) APPLICATION PROGRAMMING INTERFACE FOR EFFICIENT MULTICASTING OF COMMUNICATIONS

(75) Inventor: Khawar M. Zuberi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/526,380

(22) Filed: Sep. 25, 2006

(65) Prior Publication Data

US 2008/0077692 A1    Mar. 27, 2008

(51) Int. Cl.
G06F 15/16     (2006.01)
G06F 15/173    (2006.01)

(52) U.S. Cl. ....................... 709/228; 709/223
(58) Field of Classification Search .................. 709/228
See application file for complete search history.

(56) References Cited

U.S. PATENT DOCUMENTS

| | | | |
|---|---|---|---|
| 6,104,871 A * | 8/2000 | Badovinatz et al. | 718/100 |
| 6,160,544 A | 12/2000 | Hayashi et al. | |
| 6,173,314 B1 | 1/2001 | Kurashima et al. | |
| 6,584,096 B1 | 6/2003 | Allan | |
| 6,728,775 B1 | 4/2004 | Chaddha | |
| 6,850,987 B1 | 2/2005 | McCanne et al. | |
| 6,965,593 B2 | 11/2005 | Donahue et al. | |
| 7,124,302 B2 * | 10/2006 | Ginter et al. | 713/189 |
| 2002/0126201 A1 | 9/2002 | Schmitt et al. | |
| 2003/0014532 A1 | 1/2003 | Chang et al. | |
| 2004/0205215 A1 | 10/2004 | Kouvelas et al. | |
| 2005/0002405 A1 | 1/2005 | Gao | |
| 2005/0120378 A1 * | 6/2005 | Jalonen | 725/97 |
| 2006/0209731 A1 * | 9/2006 | Rosu et al. | 370/299 |
| 2007/0183418 A1 * | 8/2007 | Riddoch et al. | 370/389 |

OTHER PUBLICATIONS

Khawar M. Zuberu and Kang G. Shin; "An Efficient End-Host Protocol Processing Architecture for Real-Time Audio and Video Traffic"; 1998; In Proc. Network and Operating System Support for Digital Audio and Video; pp. 111-114.*

Mazumder et al., "Facilitating Robust Multicast Group Management," http://delivery.acm.org/10.1145/1070000/1066025/p183-mazumder.pdf?key1=1066025&key2=0204072511&coll=GUIDE&dl=GUIDE&CFID=15151515&CFTOKEN=6184618, Jun. 13-14, 2005.

(Continued)

*Primary Examiner*—Salad Abdullahi
*Assistant Examiner*—Blake Rubin
(74) *Attorney, Agent, or Firm*—Wolf, Greenfield & Sacks, P.C.

(57) ABSTRACT

An API enables an application to make a single call for a send operation to an operating system that results in a multicast communication. The API may provide the ability to define a socket group including one or more sockets, in which each socket represents a respective network connection to another network device. An application may utilize the socket group when calling to the operating system with a send operation, by specifying an identifier (i.e., a handle) of the socket group to the operating system. Based on the socket group identifier, the operating system may control sending multiple instances of a communication to the network devices corresponding to the connections represented by the sockets of the socket group. Tasks that are repeated for every destination of a multicast in known systems may be performed only once, reducing CPU utilization and making applications that use multicasting more scalable.

12 Claims, 5 Drawing Sheets

OTHER PUBLICATIONS

Nagareshwar, "Voice Conference Using Multicasting Technique," http://www.codeproject.com/internet/voiceconference.asp, 2003.
Perlman et al., "Techniques for Making IP Multicast Simple and Scalable," http://citeseer.ist.psu.edu/cache/papers/cs/16038/ht-tp:zSzzSzwww.cs.berkeley.eduzSz~suchizSzpaperszSZngc99-2col.pdf/perlman99techniques.pdf, Nov. 1999.
Sisalem et al., "The Multimedia Internet Terminal (MINT)," http://www.cs.columbia.edu/~hgs/papers/Sisa9809_Multimedia.pdf.

* cited by examiner

APPLICATION PROGRAMMING INTERFACE FOR EFFICIENT MULTICASTING OF COMMUNICATIONS

BACKGROUND

Networking applications sometimes need to "multicast" communications to multiple destinations. Examples of such applications include audio/video conferencing applications, webcasting applications, etc. In such applications, source content (e.g., audio/video of a person speaking) needs to be transmitted to all of the participants of the networking application (i.e., of the meeting/webcast).

Because the Internet in general does not natively support multicasting, network applications achieve "multicasting" by sending the same content (e.g., audio, video and/or data) to each destination, i.e., by sending multiple "unicasts." Consider the example of a Windows® Socket (winsock) send operation. When a networking application makes a call to the operating system through the winsock API, the following operations, among others, are performed as part of sending the content over the network:

1. Perform a lookup on the socket identifier (i.e., handle);
2. Transition from user-mode to kernel-mode;
3. Allocate a kernel-mode memory buffer and copy the content into it, or lock the application's send memory buffer into memory;
4. Pass the content to the underlying network transport (such as TCP/IP driver) for transmission over the network;
5. Signal completion of the send operation to the application; and
6. Transition back from kernel-mode to user-mode.

If a multicast is being performed (i.e., by performing multiple unicasts), then, for each additional destination of the multicast, another call for a send operation will be sent from the networking application to the operating system, and steps 1-6 will be repeated. This redundancy causes significant CPU overhead for the sending application, and can limit the scalability of the application.

SUMMARY

This Summary provides an illustrative context for aspects of the invention, in a simplified form. It is not intended to be used to determine the scope of the claimed subject matter. Aspects of the invention are described more fully below in the Detailed Description.

Described herein is an API, and methods and systems for using same, that enables an application to make a single call for a send operation to an operating system that results in a multicast communication. The API provides the ability for an application to define a socket group including one or more sockets, each socket representing a respective network connection to another network device.

An application may utilize the socket group when making a call to the operating system to perform a send operation by specifying an identifier (i.e., a handle) of the socket group to the operating system. Based on the socket group identifier, the operating system may control sending multiple instances of a communication (e.g., including the same content in each communication) to the network devices corresponding to the connections represented by the sockets of the socket group.

Tasks that are repeated for every destination of a multicast in known systems may be performed only once, as will be described in more detail below. Eliminating the redundancy of several tasks involved in a multicast send operation reduces CPU utilization, and improves the scalability of a multicast application.

Further, applications (and by extension, the application programmers) are freed from having to coordinate the making of multiple API calls to implement a multicast communication. Rather, the application can simply make a single call to the operating system (e.g., the appropriate API of the operating system) specifying a socket group, which will result in multiple instances of the communication being sent.

In one embodiment, a system is provided for creating on a network device a socket group representing one or more network connections. The system includes an application programming interface to expose one or more abstractions for creating and/or modifying a socket group abstraction that defines a socket group and associates one or more sockets with the socket group, each socket representing a single network connection.

In another embodiment, a computer program product is provided that includes at least one computer-readable medium and computer-readable signals stored on the at least one computer-readable medium. The signals define instructions that, as a result of being executed by a computer, control the computer to perform a method of multicasting a communication from a first network device to a plurality of respective second network devices. The method includes acts of: receiving an instruction indicating to send a multicast communication, the send instruction specifying an identifier of a socket group having a plurality of member sockets, each member socket representing a connection to a respective one of the plurality of second network devices; and controlling a sending of a plurality of instances of the communication based on the socket group identifier, each instance sent to a respective one of the plurality of second network devices.

In another embodiment, a communication is multicast from a first network device to a plurality of respective second network devices. A socket group representing a plurality of network connections is created and/or modified, each network connection being between the first network device and a respective one of the plurality of second network devices. A send instruction is received, which indicates to send the communication to the plurality of second network devices and specifies an identifier of the socket group. A sending of a plurality of instances of the communication based on the socket group identifier is controlled. Each instance is sent to a respective one of the plurality of second network devices.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
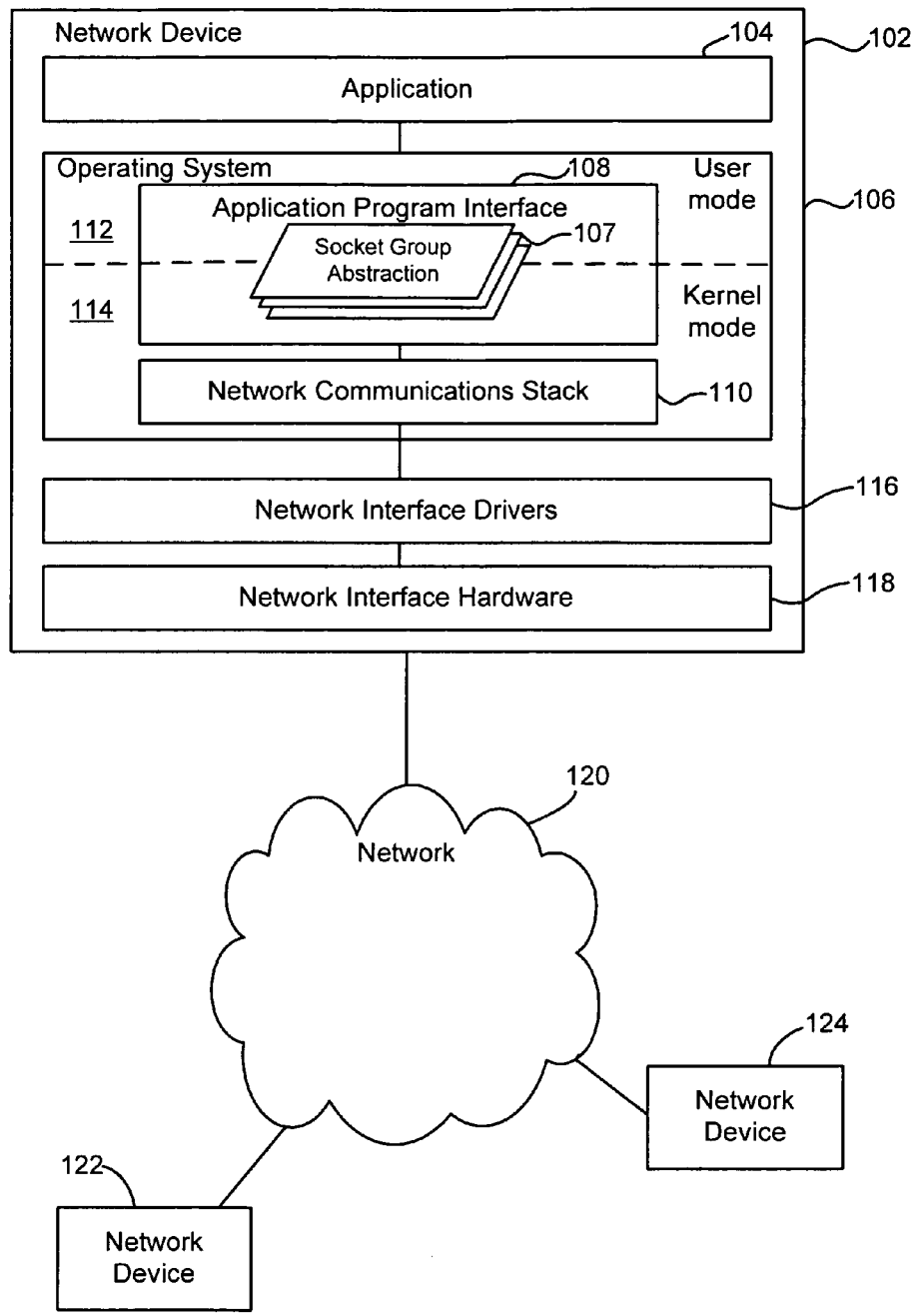
FIG. 1 is a block diagram illustrating an example of a system for using a socket group to multicast a communication, according to some embodiments of the invention.

The function and advantages of embodiments of the present invention described above and other embodiments will be more fully understood from the examples described below. The following examples are intended to facilitate a better understanding and illustrate the benefits of the present invention, but do not exemplify the full scope of the invention.

As used herein, whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, Revision 2, May 2004), Section 2111.03.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline, mobile, smart, IP-enabled, other types of telephones or any suitable combination of the foregoing); pagers; Blackberry™ brand devices, PCS devices, personal digital assistants (PDAs), two-way radios (e.g., "walkie-talkies"), other types of user devices, and any suitable combination of the foregoing.

A network (e.g., network 120 described below) may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

As used herein, an "application programming interface" or "API" is a set of one or more computer-readable instructions that provide access to one or more other sets of computer-readable instructions that define functions and/or data types, so that such functions and/or data types can be configured to be executed on a computer in conjunction with an application program. An API may be considered the "glue" between application programs and a particular computer environment or platform (e.g., any of those discussed herein) and may enable a programmer to program applications to run on one or more particular computer platforms or in one or more particular computer environments.

EXAMPLES

FIG. 1 is a block diagram illustrating an example of a system 100 for using a socket group to multicast a communication, according to some embodiments of the invention. As used herein, "sending a multicast communication" or "multicasting a communication" means to send multiple instances of a communication to multiple different destinations. System 100 is merely an illustrative embodiment of a system for using a socket group to multicast a communication, and is not intended to limit the scope of the invention. Any of numerous other implementations of such a system, for example, variations of system 100, are possible and are intended to fall within the scope of the invention.

System 100 may include any of: network device 102; network device 122; network device 124; other network devices; network 120; other network elements; and any suitable combination of the foregoing. Network device 102 (and any of the other network devices) may include any of: one or more applications 104; an operating system 106; one or more network interface drivers 116; network interface hardware 118; other components; and any suitable combination of the foregoing.

Operating system 106 may include any of: API 108 (e.g., a winsock API); a network communications stack 110 (e.g., a TCP/IP stack); other components; and any suitable combination of the foregoing.

Operating system 106 may be operative to implement a user mode 112 and a kernel mode 114. The operating system may act in kernel mode when performing core functionality of the operating system, thereby providing the core functionality more precedence and privileges than may be afforded functionality that is considered more auxiliary in nature. The operating system may implement such auxiliary functionality in user mode. As will be described in more detail below in relation to FIGS. 5 and 6, using a socket group to multicast a communication involves the operating system transitioning from user mode to kernel mode, and from kernel mode back to user mode.

API 108 may expose one or more socket group abstractions 107 for creating and/or modifying a socket group abstraction that defines a socket group. Modifying a socket group abstraction may involve associating (and/or disassociating) one or more sockets (e.g., group members) with the socket group, where each socket represents a single network connection. For example, one or more socket group abstractions 107 may define a function or other abstraction that enables an application to: create a socket group; add a socket to the socket group; remove a socket from the socket group; destroy the socket group; perform another operation; or any suitable combination of the foregoing.

For example, digressing briefly from FIG. 1, FIGS. 2-4 illustrate abstractions that may be provided as part of a winsock API.

Figure 2:
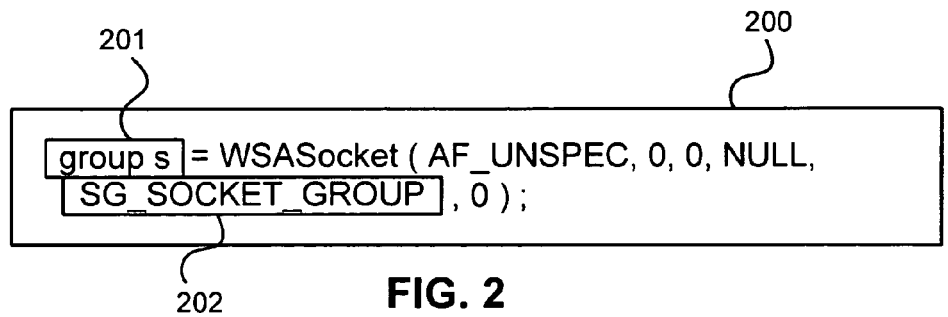
FIG. 2 is a block diagram illustrating an example of a winsock API function call to create a socket group, according to some embodiments of the invention.

FIG. 2 is a block diagram illustrating an example of a winsock API function call 200 to define a socket group, according to some embodiments of the invention. Function call 200 is merely an illustrative embodiment of a function call to define a socket group, and is not intended to limit the scope of the invention. Any of numerous other implementations of such a function call, for example, variations of function call 200, are possible and are intended to fall within the scope of the invention.

The "WSASocket" function call 200 includes a parameter value 202 that specifies that this function call is to create a socket group. As illustrated by element 201, the name of the socket group being created is "group_s." Although not illustrated in FIG. 2, the WSASocket function or another API function for creating a socket group (e.g., of a non-winsock API) also may specify a socket type (e.g., datagram) and a protocol (e.g., User Data Protocol (UDP) or Transmission Control Protocol (TCP)) that a socket must have to join the group.

Figure 3:
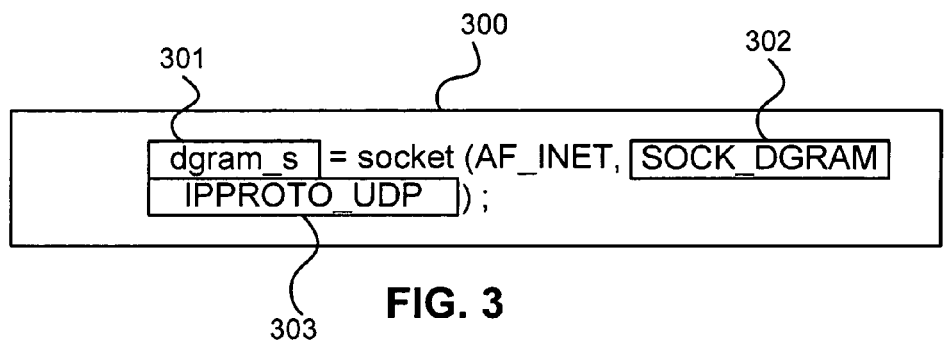
FIG. 3 is a block diagram illustrating an example of a winsock API function call to create a socket, according to some embodiments of the invention.

FIG. 3 is a block diagram illustrating an example of a winsock API function call 300 to create a socket, according to some embodiments of the invention. Function call 300 is merely an illustrative embodiment of a function call for creating a socket, and is not intended to limit the scope of the invention. Any of numerous other implementations of such a function call, for example, variations of function call 300, are possible and are intended to fall within the scope of the invention. It should be appreciated, however, that a socket group may be defined to not restrict the type of socket or protocol of its members.

As illustrated in FIG. 3, the "socket" function call 300 creates a socket 301 named "dgram_s". The socket function may provide a parameter that enables an application to specify the type of socket, for example, corresponding to the type of connection represented by the socket. The socket function also may provide a parameter that enables an application to specify a protocol to use for the socket, for example, corresponding to the protocol used by the connection represented by the socket. For example, as illustrated in function call 300, parameter 302 may indicate that the socket is of a datagram type and a parameter 303 that specifies that socket 301 is for a UDP connection.

Figure 4:
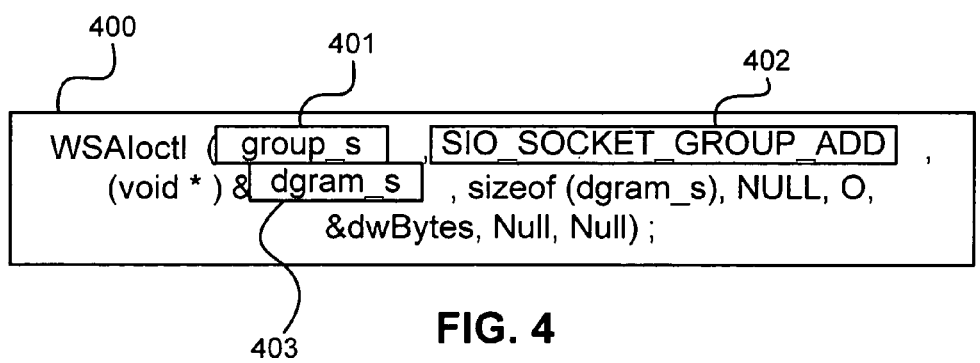
FIG. 4 is a block diagram illustrating an example of a winsock API function for adding a socket to a socket group, according to some embodiments of the invention.

FIG. 4 is a block diagram illustrating an example of a winsock API function call 400 for adding a socket to a socket group, according to some embodiments of the invention. Function call 400 is merely an illustrative embodiment of a function call for adding a socket to a socket group, and is not intended to limit the scope of the invention. Any of numerous other implementations of such a function, for example, variations of function call 400, are possible and are intended to fall within the scope of the invention.

Parameter 401 identifies the socket group to which a socket is to be added (in this case, the socket group created by function call 200), and parameter 402 specifies the socket to be added to the socket group (in this case, the socket created by function call 300). By specifying parameter 402, function call 400 specifies to add the socket identified by parameter 403 to the socket group identified by parameter 401. That is, function call 400 will result in socket "dgram_s" being added to socket group "group_s."

Returning to FIG. 1, it should be appreciated that socket group abstractions 107 may include types of abstractions other than those illustrated in relation to FIGS. 2-4 (e.g., other winsock API abstractions or abstractions for another API and/or operating system). For example, API 108 may include a function for removing a socket from a socket group. In an embodiment using a winsock API, such a function may be implemented with the function 400 by changing parameter 402 to a parameter that specifies to remove the identified socket from the socket group.

In some embodiments of the invention, a function may be provided that enables the creation of a socket and the adding of the socket to a socket group to be combined. For example, a function may allow an application to specify a socket group when creating a socket. Further, in some embodiments, a socket can only be a member of one socket group at any given time. It should be appreciated that, in such embodiments, the socket can be removed from one socket group and added to another, but cannot be a member of two or more socket groups at the same time.

In addition, some embodiments of the invention may provide a function allowing an application to add network addresses associated with network devices directly to a socket group. With these embodiments, rather than creating a socket, connecting the socket to a network device, and adding the socket to the socket group, the application may simply add network addresses to a socket group, allowing the step of creating a socket to represent a network device to be skipped.

An application component (e.g., of application 104) may utilize the one or more socket group abstractions 107 to create and/or modify a socket group (e.g., using function 400 or a similar function defined for another API and/or operating system), and use one or more of the software group abstractions to instruct the operating system 106 to multicast a communication.

A socket in a socket group may represent a connection to a network device, or any other suitable communication recipient. Any suitable technique may be employed to connect a socket to a network device. For example, in some embodiments, an application component may employ any of numerous operating system APIs (such as the WSAConnect winsock API) to connect a socket to a network device. However, the invention is not limited to such an implementation.

The application component may instruct the operating system to multicast a communication by specifying a socket group identifier in a call to the operating system to perform a send operation. The operating system 106 may be configured to control the sending of the multiple instances of the communication based on the specified socket group identifier to the multiple destinations (e.g., network device 122 and/or 124) e.g., through the stack 110, drivers 116 and network interface hardware 118, and across network 122. An example of how this controlling is performed is described below in more detail in relation to FIGS. 5 and 6.

Although socket groups are described herein primarily in relation to multicast communication, it should be appreciated that a multicast group may be used to send a single communication to a single destination. This may occur if the socket group includes only one socket member when an application specifies the socket group in a send instruction sent to the operating system.

System 100 and components thereof may be implemented using any of a variety of technologies, including software (e.g., C, C#, C++, Java, J# or a combination thereof), hardware (e.g., one or more application-specific integrated circuits), firmware (e.g., electrically-programmed memory) or any combination thereof. Further, each of the components of system 100 may reside in one or more locations on the system 100. For example, different portions of the components may reside in different areas of memory (e.g., RAM, ROM, disc, etc.) on the system 100. System 100 may include, among other components, a plurality of known components such as one or more processors, a memory system, a disc storage system, one or more network interfaces, and one or more busses or other internal communication links interconnecting the various components. System 100, and components thereof, may be implemented using one ore more computer systems such as the computer system described below in relations to FIGS. 7 and 8.

Figure 5:
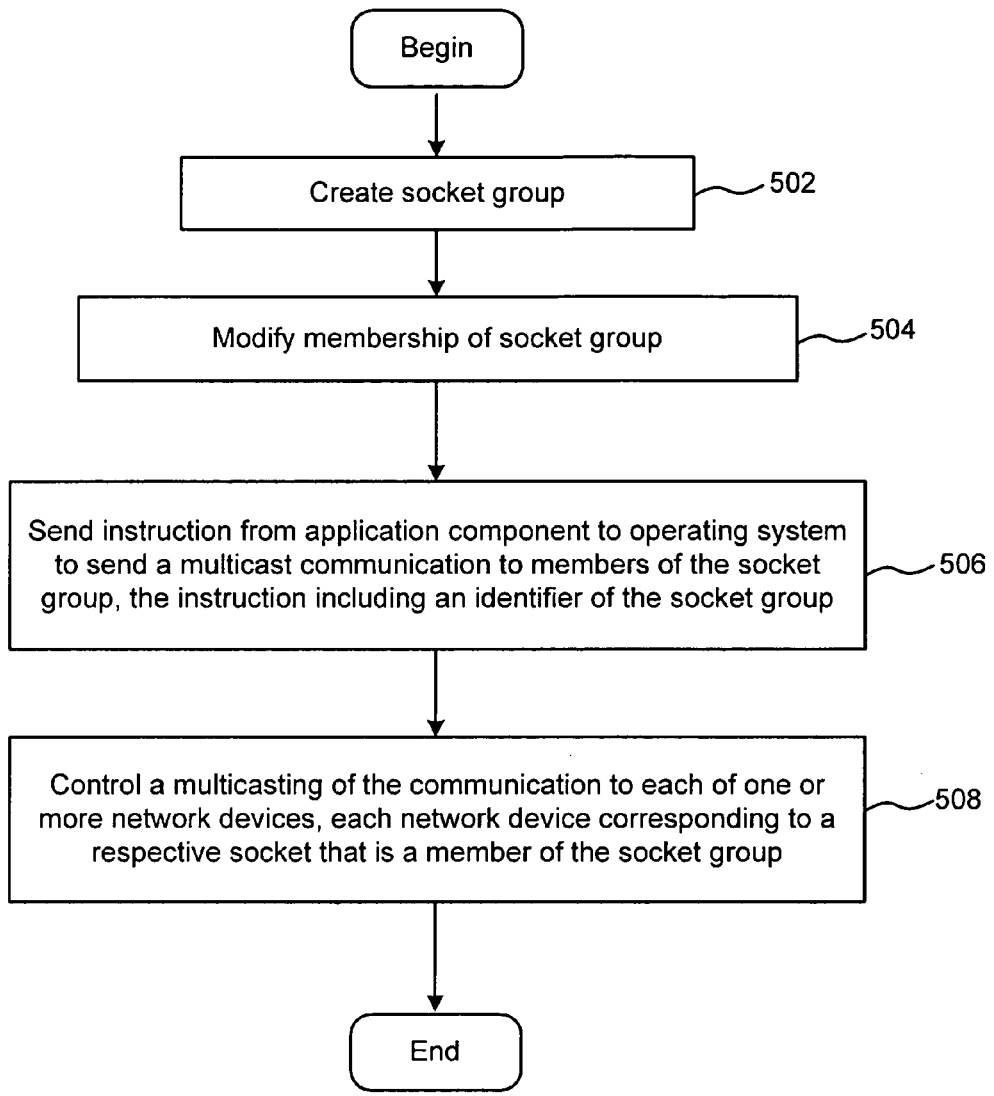
FIG. 5 is a flow chart illustrating an example of a method for using a socket group to multicast a communication, according to some embodiments of the invention.

FIG. 5 is a flow chart illustrating an example of a method 500 for using a socket group to multicast a communication, according to some embodiments of the invention. Method 500 is merely an illustrative embodiment of a method for using a socket group to multicast a communication, and is not intended to limit the scope of the invention. Any of numerous other implementations of such a method, for example, variations of method 500, are possible and are intended to fall within the scope of the invention.

In Acts 502 and 504, a socket group is created and membership of the socket group is modified, respectively, for example, as described above in relation to FIGS. 1-4. One or more socket group abstractions 107 may be used by an application to create a socket group and modify its membership (i.e., add and remove member sockets).

In Act 506, an application component (e.g., a component of application 104) may send an instruction to an operating system (e.g., operating system 106) to send a multicast communication to members of the created socket group. The instruction may include an identifier (i.e., handle) of the socket group.

In Act 508, a multicasting of the communication to each of one or more network devices may be controlled. Each network device may correspond to a respective socket that is a member of the socket group. Based on the socket group identifier included in the instruction sent from the application component, the members of the socket group may be identified, and the communication multicast to network devices corresponding to the identified members, for example, as described below in more detail in relation to FIG. 6.

Method 500 also may include additional acts. Further, the order of the acts performed as part of method 500 is not limited to the order illustrated in FIG. 5, as the acts may be performed in other orders and/or one or more of the acts may be performed in parallel, at least partially.

Figure 6:
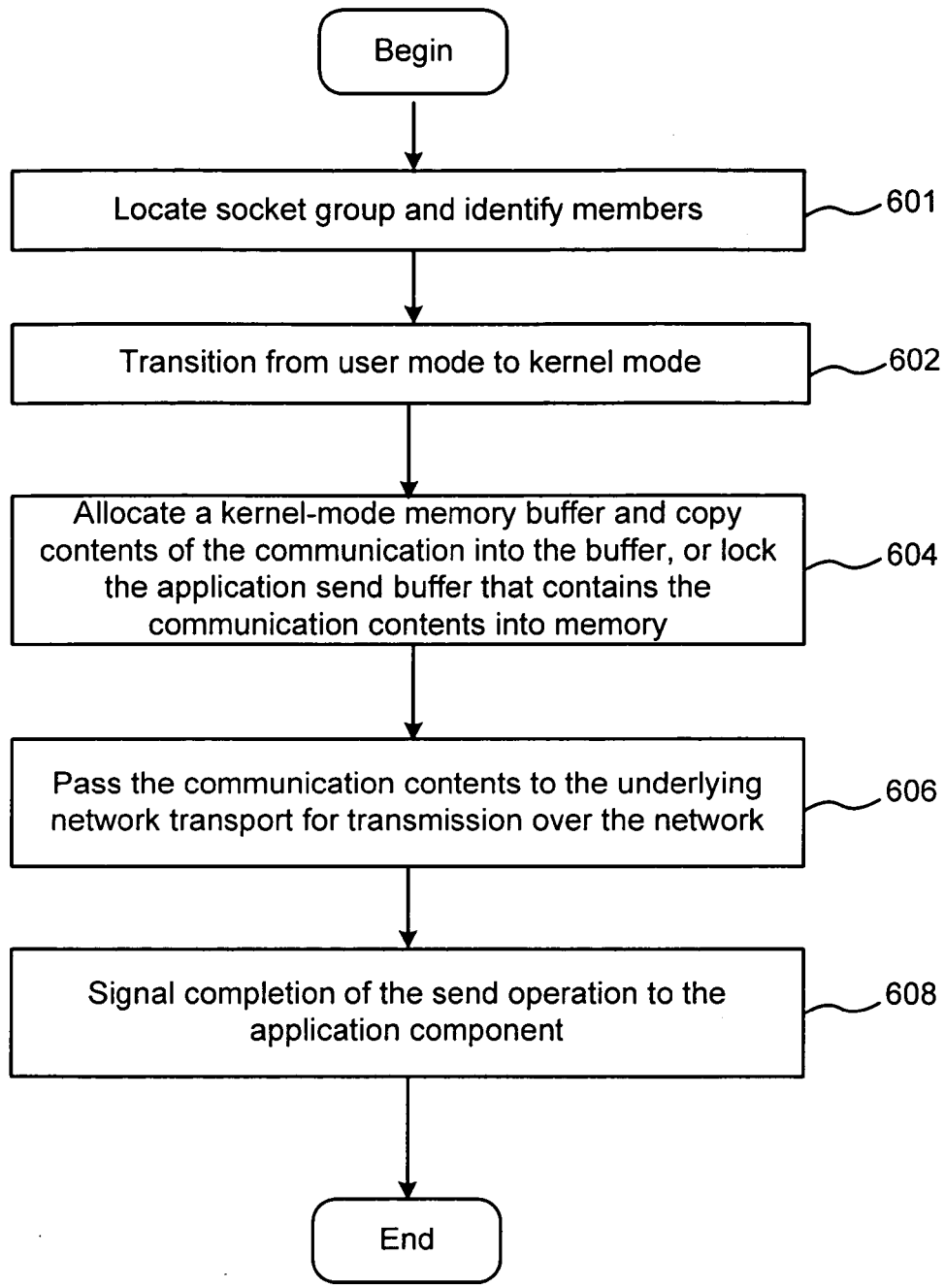
FIG. 6 is a flow chart illustrating an example of a method of controlling a multicast of a communication to members of a socket group, according to some embodiments of the invention.

FIG. 6 is a flow chart illustrating an example of a method 600 of controlling a multicast of a communication to members of a socket group, according to some embodiments of the invention. Method 600 is merely an illustrative embodiment of a method of controlling a multicast communication to members of a socket group, and is not intended to limit the scope of the invention. Other implementations of such a method, for example, variations of method 600, are possible and are intended to fall within the scope of the invention.

In Act 601, the socket group identified in the send instruction received from the application component is located, and the members of the socket group (i.e., the sockets) are identified. In Act 602, the operating system transitions from user mode to kernel mode. Transitioning between user mode and kernel mode is a relatively expensive operation in terms of CPU time, involving address changes, potentially context changes, etc. In some embodiments of the invention, Acts 601 and 602 are only performed once as part of controlling a multicasting of the communication based on the socket group identifier. This is in contrast to known systems, where performing a lookup for a socket identifier and a transition from user mode to kernel mode would be performed for each separate unicast communication of the multicast.

In Act 604, a kernel-mode memory buffer may be allocated to the multicast communication and the contents of the communication may be copied into the buffer. A kernel-mode memory buffer is a buffer in memory (as opposed to disk) that is reserved for kernel-mode operations (due to their higher priority). Using memory as opposed to disk is advantageous because it is faster to access information from memory than from disk. Further, the communication contents should be stored there because the network hardware (e.g., Network Interface Card (NIC)) cannot access information (e.g., the communication content) from disk.

Alternatively, Act 604 may lock the application send buffer that contains the communication contents into memory. That is, the operating system may prevent the application send buffer from being copied to disk, which would require the use of virtual memory and would slow the send operation. Further, as noted above, the network hardware (e.g., a network interface card (NIC)) is not capable of handling virtual memory.

Regardless of whether Act 604 includes allocating kernel-mode memory or locking the application send buffer into memory, Act 604 may be performed once for the multicast communication. This is in contrast to known systems, where act 604 would be performed separately for each unicast communication of a multicast.

In Act 606, the communication contents for the multicast may be passed to the underlying network transport for transmission over the network. For example, Act 606 may include passing the communication contents through network stack 110 to one or more network interface drivers 116 for sending to network hardware 118. In some embodiments, Act 606 may be performed only once for the multicast communication, in contrast to known systems in which Act 606 is performed separately for each unicast communication of the multicast.

In Act 608, completion of the send operation may be signaled to the application component that instructed that the send operation be performed. In known applications, Act 608 would be performed after the completion of each unicast communication of the multicast, resulting in Acts 601-608 to be repeated (albeit without the benefits of a socket group) for each additional unicast communication of the multicast. In contrast, Act 608 is performed only once for a multicast in some embodiments of the invention.

The timing of the performance of Act 608 during method 600 may vary. For example, if a kernel-mode memory buffer was allocated in Act 604, then Act 608 may be performed at the completion of the passing of the communication contents in Act 606. Alternatively, if Act 604 involves locking the application send buffer that contains the communication contents into memory then the timing of performance of Act 608 may be different. In this case, after the network interface hardware 118 (e.g., a NIC) finishes sending each instance of the communication to network 120, it may generate an interrupt to the stack 110 through one of the network interface drivers 116. This interrupt may indicate completion of the send operation, and return control of the send buffer back to the stack 110. Stack 110 then may return the send buffer back to the API 108, which, in response, may unlock the send buffer from memory. The operating system 106 (e.g., API 108) then may signal completion of the send operation to the application component in Act 608.

Method 600 may include additional acts, including any known tasks involved in an operating system controlling a network send operation. Further, the order of the acts performed as part of method 600 is not limited to the order illustrated in FIG. 6, as the acts may be performed in other orders and/or one or more of the acts may be performed in parallel, at least partially. For example, the operating system may be configured to transition between user mode and kernel-mode at different times during the performance of method 600 then those shown in FIG. 6.

Methods 500 and 600 and/or acts thereof, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can be accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (including methods 500, 600 and/or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 700 and 800 described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 7:
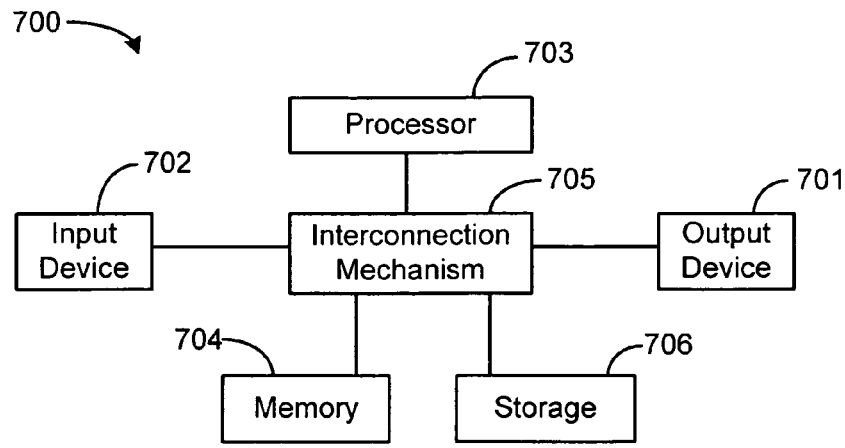
FIG. 7 is a block diagram illustrating an example of a computer system on which some embodiments of the invention may be implemented.
Figure 8:
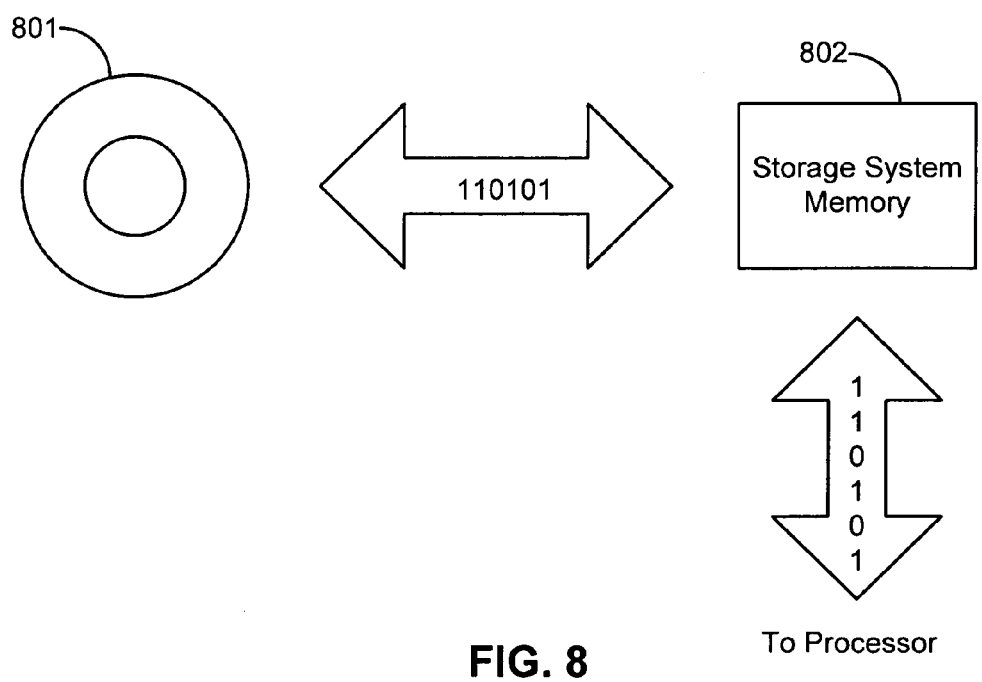
FIG. 8 is a block diagram illustrating an example of a storage system that may be used as part of the computer system to implement some embodiments of the invention.

It should be appreciated that any single component or collection of multiple components of a computer system, for example, any of the computer systems described in relation to FIGS. 1, 7 and 8, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700. Computer system 700 also includes one or more input devices 702, for example, a keyboard, mouse, trackball, microphone, touch screen, and one or more output devices 701, for example, a printing device, display screen, speaker. In addition, computer system 700 may contain one or more interfaces (not shown) that connect computer system 700 to a communication network (in addition or as an alternative to the interconnection mechanism 705).

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random access memory (DRAM) or static memory (SRAM). It may be located in storage system 706, as shown, or in memory system 704, not shown. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system shown in FIG. 7. Various aspects of the invention may be practiced on one or more computers having a different architecture or components that that shown in FIG. 7.

Computer system 700 may be a general-purpose computer system that is programmable using a high-level computer programming language. Computer system 700 also may be implemented using specially-programmed, special-purpose hardware. In computer system 700, processor 703 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system for creating a socket group representing one or more network connections, the system comprising:
a first network device; and
an application programming interface operative to:
expose one or more abstractions for creating and/or modifying a socket group abstraction representing a plurality of network connections, each network connection being between the first network device and a respective one of a plurality of second network devices;

receive a send instruction indicating to send the communication to the plurality of second network devices, the send instruction specifying an identifier of a socket group;

control a sending of a plurality of instances of the communication based on the socket group identifier, each instance sent to a respective one of the plurality of second network devices;

wherein the first network device comprises an operating system operative to implement a user mode and a kernel mode, and the controlling comprises:

making only a single transition from the user mode to the kernel mode, allocating a kernel-mode memory buffer only once or locking an application send buffer into memory only once; and signaling completion of the sending of the plurality of instances, only once, to an application component that sent the send request to the operating system.

2. The system of claim 1, wherein the one or more abstractions comprise a create function for creating the socket group.

3. The system of claim 1, wherein the one or more abstractions comprise an add function for adding a socket to the socket group.

4. The system of claim 1, wherein the one or more abstractions comprise a remove function for removing a socket from the socket group.

5. The system of claim 1, wherein the application programming interface is part of an operating system of the network device.

6. A computer program product comprising:

at least one computer-readable storage medium; and instructions stored on the at least one computer-readable storage medium which, as a result of being executed by a computer, control the computer to perform a method of multicasting a communication from a first network device to a plurality of respective second network devices, the method comprising acts of:

(A) creating and/or modifying a socket group representing a plurality of network connections, each network connection being between the first network device and a respective one of the plurality of second network devices;

(B) receiving a send instruction indicating to send the communication to the plurality of second network devices, the send instruction specifying an identifier of the socket group; and (C) controlling a sending of a plurality of instances of the communication based on the socket group identifier, each instance sent to a respective one of the plurality of second network devices;

wherein the first network device comprises an operating system operative to implement a user mode and a kernel mode, and the act (C) comprises:

making only a single transition from the user mode to the kernel mode;

allocating a kernel-mode memory buffer only once or locking an application send buffer into memory only once; and signaling completion of the sending of the plurality of instances, only once, to an application component that sent the send request to the operating system.

7. The computer program product of claim 6, wherein the act (B) comprises: determining the plurality of member sockets based on the socket group identifier.

8. The computer program product of claim 6, wherein the act (B) comprises:

locating a socket group abstraction identified by the socket group identifier received in the send instruction.

9. A method of multicasting a communication from a first network device to a plurality of respective second network devices, the method comprising acts of:

(A) creating and/or modifying a socket group representing a plurality of network connections, each network connection being between the first network device and a respective one of the plurality of second network devices;

(B) receiving a send instruction indicating to send the communication to the plurality of second network devices, the send instruction specifying an identifier of the socket group; and (C) controlling a sending of a plurality of instances of the communication based on the socket group identifier, each instance sent to a respective one of the plurality of second network devices;

wherein the first network device comprises an operating system operative to implement a user mode and a kernel mode, and the act (C) comprises:

making only a single transition from the user mode to the kernel mode;

allocating a kernel-mode memory buffer only once or locking an application send buffer into memory only once; and signaling completion of the sending of the plurality of instances, only once, to an application component that sent the send request to the operating system.

10. The method of claim 9, wherein the socket group includes a plurality of sockets, each socket representing a connection to one of the respective second network devices, and wherein the act (C) comprises determining the plurality of sockets based on the socket group identifier.

11. The method of claim 9, wherein the act (B) comprises:

receiving the send instruction from an application component to initiate the multicast to a plurality of respective other application components, each other application component residing on a respective one of the second network devices.

12. The method of claim 9, wherein the act (C) comprises:

locating a socket group abstraction identified by the socket group identifier received in the send instruction.

* * * * *